United States Patent [19]

Hapashy et al.

[11] Patent Number: 5,210,495
[45] Date of Patent: May 11, 1993

[54] ELECTROMAGNETIC LOGGING METHOD AND APPARATUS WITH SCANNED MAGNETIC DIPOLE DIRECTION

[75] Inventors: Tarek M. Hapashy, Danbury; Jeffrey A. Beren, Westport, both of Conn.; Kambiz A. Safinya, Jakarta Selatan, India

[73] Assignee: Schlumberger Technology Corp., New York, N.Y.

[21] Appl. No.: 848,576

[22] Filed: Mar. 9, 1992

Related U.S. Application Data

[63] Continuation-in-part of Ser. No. 706,454, May 24, 1991.

[51] Int. Cl.$^5$ .................................................. G01V 3/30
[52] U.S. Cl. ..................................... 324/338; 324/341
[58] Field of Search ................................. 324/337-341

[56] References Cited

U.S. PATENT DOCUMENTS

| | | | |
|---|---|---|---|
| 3,849,721 | 11/1974 | Calvert | 324/338 |
| 3,944,910 | 3/1976 | Rau | 324/338 |
| 4,340,934 | 7/1982 | Segesman | 364/422 |
| 4,360,777 | 11/1982 | Segesman | 324/339 |
| 4,468,623 | 8/1984 | Gianzero et al. | 324/367 |
| 4,567,759 | 2/1986 | Ekstrom et al. | 73/152 |
| 4,652,829 | 3/1987 | Safinya | 324/338 |
| 4,689,572 | 8/1987 | Clark | 324/341 |
| 4,692,908 | 9/1987 | Ekstrom et al. | 367/27 |
| 4,704,581 | 11/1987 | Clark | 324/341 |
| 4,766,384 | 8/1988 | Kleinberg et al. | 324/339 |
| 4,831,331 | 5/1989 | De et al. | 324/338 |
| 4,857,852 | 8/1989 | Kleinberg et al. | 324/339 |
| 4,979,151 | 12/1990 | Ekstrom et al. | 367/35 |
| 5,066,916 | 11/1991 | Rau | 324/338 |

*Primary Examiner*—Gerard R. Strecker
*Attorney, Agent, or Firm*—Martin M. Novack; Leonard W. Pojunas

[57] ABSTRACT

In a form of the disclosure, electromagnetic propagation logging measurements are made for several magnetic moment directions of the electromagnetic energy, and can be examined and/or processed retrospectively in order to select the logging information which has a particular desired characteristic, such as the sharpest imaging of bed boundaries. By scanning the magnetic moment over a wide range of angles, one is assured of obtaining logging information that has a desired attribute, such as image sharpness. This can be determined by viewing a recorded log and/or by automatically processing the log data. Information from other ones of the several logs may be useful in optimizing other attributes, such as standoff immunity or signal-to-noise ratio.

29 Claims, 10 Drawing Sheets

ELECTROMAGNETIC LOGGING METHOD AND APPARATUS WITH SCANNED MAGNETIC DIPOLE DIRECTION

RELATED APPLICATIONS

This is a continuation-in-part of U.S. patent application Ser. No. 706,454, filed May 24, 1991, of K. Safinya, T. Habashy, and J. Beren. The subject matter of this application is related to subject matter disclosed in U.S. patent application Ser. No. 848,621, filed of even date herewith and assigned to the same assignee as the present application.

FIELD OF THE INVENTION

This invention relates to logging of earth boreholes and, more particularly, to a method and apparatus for logging using electromagnetic energy.

BACKGROUND OF THE INVENTION

The measurement of dielectric constant (or dielectric permittivity) of formations surrounding a borehole is known to provide useful information about the formations. The dielectric constant of the different materials of earth formations vary widely (for example, 2.2 for oil, 7.5 limestone, and 80 for water), so measurement of dielectric properties is a useful means of formation evaluation.

A logging device which measures formation dielectric constant is disclosed in the U.S. Pat. No. 3,944,910. The logging device includes a transmitter and spaced receivers mounted in a pad that is urged against the borehole wall. Microwave electromagnetic energy is transmitted into the formations, and energy which has propagated through the formations is received at the receiving antennas. The phase shift and attenuation of the energy propagating in the formations is determined from the receiver output signals. The dielectric constant and, if desired, the conductivity of the formations can then be obtained from the phase and attenuation measurements. Measurements are typically, although not necessarily, made on the formation invaded zone. Two transmitters are generally used in a borehole compensated array to minimize the effect of borehole rugosity, tool tilt, and dissimilarities in the transmitters, receivers, and their circuits. [See, for example, U.S. Pat. No. 3,849,721.]

The antennas shown in U.S. Pat. No. 3,944,910 are slot antennas, each having a probe that extends across the slot in a direction parallel to the longitudinal direction of the borehole. This configuration has become known as a "broadside" array. The U.S. Pat. No. 4,704,581 describes a logging device of similar type, but wherein the slot antennas have probes that extend in a direction perpendicular to the longitudinal direction of the borehole. This configuration has become known as an "endfire" array. The endfire array exhibits a deeper depth of investigation and is less affected by tool standoff (e.g. from mudcake) than the broadside array. On the other hand, the broadside array exhibits a stronger signal characteristic than the endfire array and may be preferred in relatively lossy (low resistivity) logging environments.

A logging device which utilizes teachings of the above-referenced U.S. Pat. Nos. 3,944,910 and 4,704,581 is the electromagnetic propagation tool ("EPT"—mark of Schlumberger). A so-called adaptable EPT ("ADEPT") can provide either broadside operation or endfire operation during a given logging run, depending on conditions. The ADEPT logging tool has two changeable pads, one containing a broadside antenna array and the other an endfire antenna array.

It is among the objects of the present invention to provide an improvement in the determination of properties of the formations in the propagation logging of earth boreholes. It is also among the objects of the present invention to provide improved techniques and equipment for the accurate determination of properties of subsurface formations using electromagnetic energy having a magnetic dipole characteristic.

SUMMARY OF THE INVENTION

In the parent application hereof, there is disclosed a so-called "cross-dipole" antenna that can be energized to produce electromagnetic energy having a magnetic dipole characteristic with a selectable magnetic moment direction. These antennas can be used, for example, to obtain an endfire operating mode at a particular time and a broadside operating mode at another time. The antennas have orthogonal probes in a slot, and the angle (or direction) of the magnetic moment can be adjusted by applying signals of appropriate amplitude and phase to the probes. It is demonstrated in the parent Application that when the magnetic moment or the longitudinal direction of the array is perpendicular to the formation bedding direction, the logging image is sharper; i.e., bed boundaries and measurement values are more accurately delineated. The parent Application also observes that improved standoff performance (that is, immunity to the media between the logging device antennas and the formations) is obtained when the magnetic moment is parallel to the borehole axis. However, the bedding direction and/or the precise orientation of the tool with respect to the borehole may not be known a priori.

In a form of the present invention, electromagnetic propagation logging measurements are made for several magnetic moment directions of the electromagnetic energy, and can be examined and/or processed retrospectively in order to select the logging information which has a particular desired characteristic, such as the sharpest imaging of bed boundaries. By scanning the magnetic moment over a wide range of angles, one is assured of obtaining logging information that has a desired attribute, such as image sharpness. This can be determined by viewing a recorded log and/or by automatically processing the log data, such as with an edge detection routine. Information from other ones of the several logs may be useful in optimizing other attributes, such as standoff immunity or signal-to-noise ratio.

In an accordance with an embodiment of the invention, there is set forth a method and apparatus for logging formations surrounding an earth borehole. A logging device is provided and is moveable through the borehole. The device includes a transmitter for transmitting into the formations electromagnetic energy having a magnetic dipole characteristic and a receiver for receiving the electromagnetic energy from the formations. Preferably, the transmitter and receiver comprise slot antennas mounted in a member that is adapted for engagement with the borehole wall. Means are provided for repeatedly scanning the magnetic dipole direction of the electromagnetic energy to several directions as the logging device is moved through the borehole. Several logs of the electromagnetic energy are recorded, the logs being recorded for respectively different magnetic dipole directions of the electromagnetic energy. As will be described, the scanning can be implemented with the logging device stationary or in motion, with each scan being implemented before the device has moved by a meaningful distance. In the present embodiment, a full scan is implemented before the logging device has moved longitudinally by 1 mm, although this is not strictly necessary.

In the disclosed embodiment, said several different magnetic dipole directions comprise directions that span more than 90 degrees and, preferably, more than 135 degrees. Also in the preferred embodiment, the phase shift and attenuation of the electromagnetic energy is measured and stored for said several magnetic dipole directions, and the dielectric permittivity and the conductivity of the formations is determined for at least one, and preferable a plurality, of said several different magnetic dipole directions. Also in the preferred embodiment, cross-dipole antennas are employed, and the amplitudes and phases of the signals applied to orthogonal probes of the cross-dipole antennas are utilized in scanning the magnetic dipole direction.

Further features and advantages of the invention will become more readily apparent from the following detailed description when taken in conjunction with the accompanying drawings.

DETAILED DESCRIPTION

Figure 1:
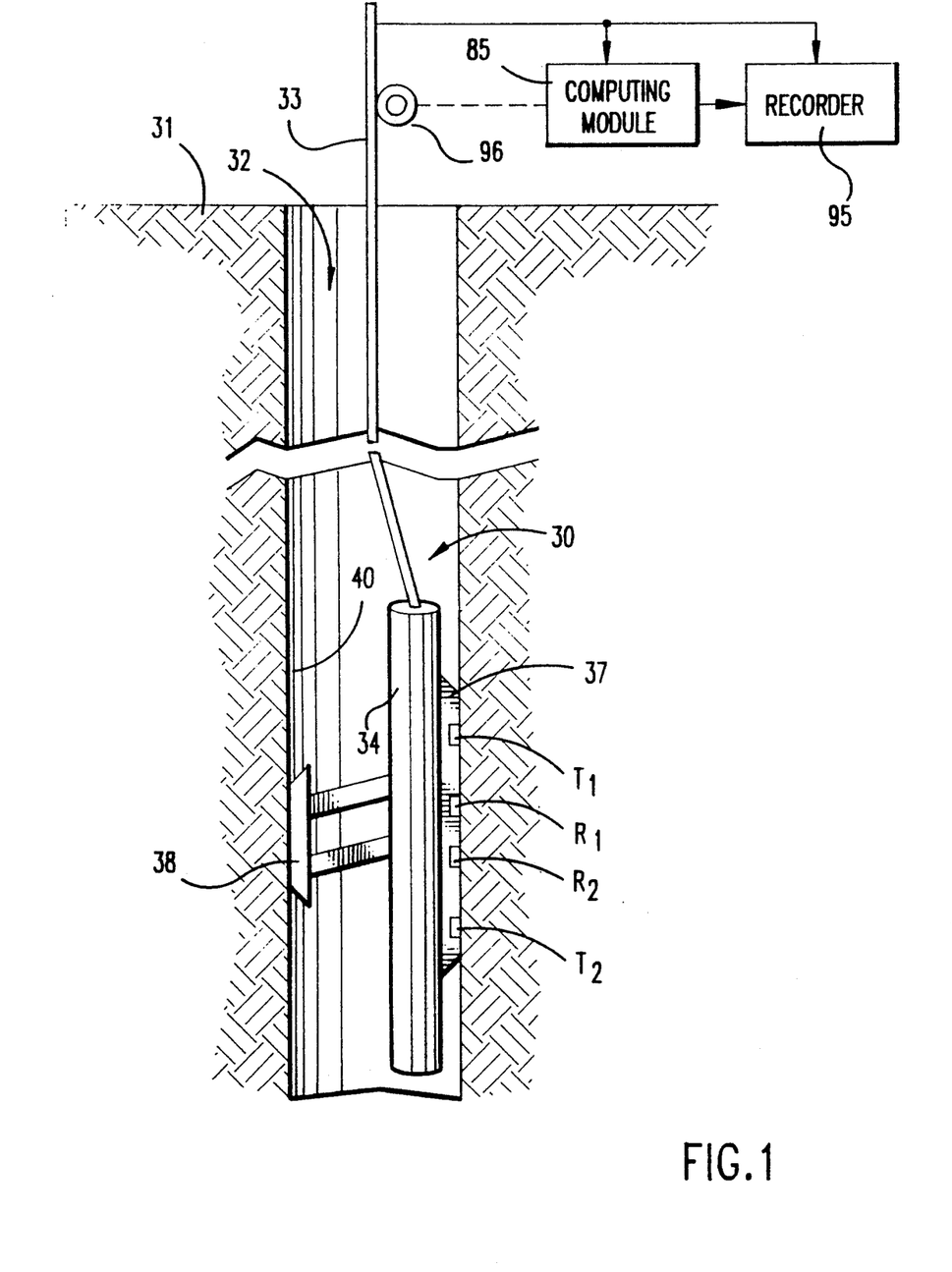
FIG. 1 is a schematic representation, partially in block diagram form, of apparatus which can be used in practicing embodiments of the invention.

Referring to FIG. 1, there is shown an apparatus 30, for investigating subsurface formations 31 traversed by a borehole 32, which can be used in practicing embodiments of the invention. The borehole 32 is typically filled with a drilling fluid or mud which contains finely divided solids in suspension. Generally, the fluid pressure in the formations traversed by the borehole is less than the hydrostatic pressure of the column of mud in the borehole, so that the mud and mud filtrate flow somewhat into the formations. As is well known, the formations tend to screen the small particles suspended in the mud so that a mudcake 40 can form on the walls of the borehole.

The investigating apparatus or logging device 30 is suspended in the borehole 32 on an armored cable 33, the length of which substantially determines the relative depth of the device 30. The cable length is controlled by suitable means at the surface such as a drum and winch mechanism (not shown). The logging device 30 includes an elongated cylindrical sonde 34, the interior portion of which has a housing containing the bulk of the downhole electronics. Mounted on one side of sonde 34 is a pad 37 which contains, inter alia, vertically spaced transmitting antennas T1 and T2, and vertically spaced receiving antennas R1 and R2 between the transmitting antennas. On the other side of sonde 34 is mounted a backup arm 38 which may be hydraulically controlled to maintain the pad 37 in contact with the borehole wall. The backup arm 38 can also be used to provide a caliper reading. [The pad 37 mounted directly on the sonde 34 is sometimes also referred to as a skid. The term "pad" is used herein and is intended to generically indicate an intention of contact with the surface of the borehole wall.] The particular means shown in FIG. 1 for maintaining the antennas in engagement with the borehole wall is illustrative, and it will be appreciated that other known suitable means for accomplishing this objective can be utilized. In embodiments hereof, signals are stored downhole by memory associated with a downhole processor, but it will be understood that some or all signals could be transmitted uphole for processing and/or storage. Electronic signals indicative of the information obtained by the logging device can be transmitted through the cable 33 to a computing module 85 and a recorder 95, located at the surface of the earth. Depth information to the recorder 95 and computing module 85 can be provided from a rotating wheel 96 that is coupled to the cable 33. The computing module 85 will typically include a processor, and associated memory, timing, input/output, display, and printing functions, none of which are separately shown.

Figure 2:
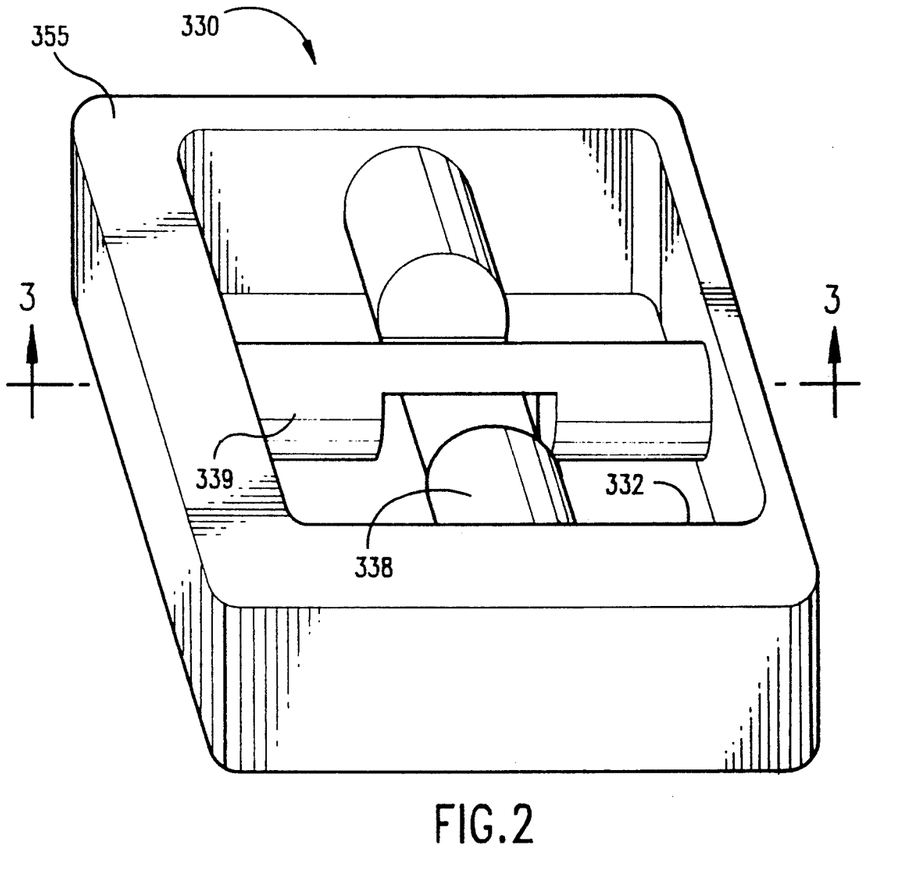
FIG. 2 is an elevational perspective view of a cross-dipole antenna that can be used in embodiments of the invention.
Figure 3:
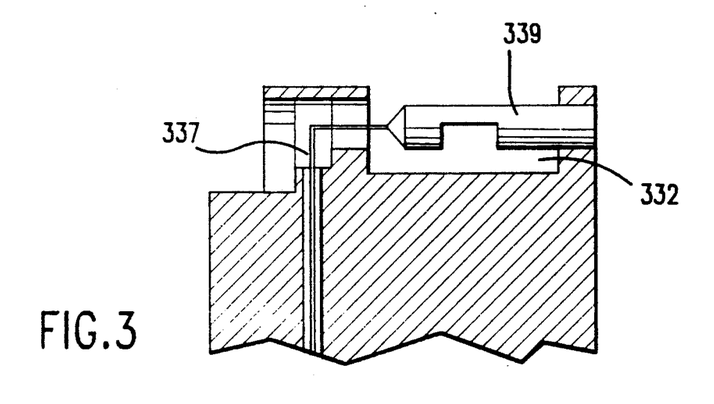
FIG. 3 is a cross-sectional view as taken through a section defined by arrows 3—3 of FIG. 2.

As first noted above, in the parent Application hereof there is disclosed a cross-dipole antenna that can be energized to produce electromagnetic energy having a magnetic dipole characteristic. FIGS. 2 and 3 show the cross dipole antenna, which is used in the embodiments hereof. The antenna 330 comprises a generally square aperture or slot 332 in a metal body 355. Metal probe elements 338 and 339 cross the slot from different opposing sides, but are notched at their centers, so as to not touch where they cross. A dielectric material fills the rest of the slot. The cross-section of FIG. 3 shows one of the probes (339), which is seen to be shorted at one end to a wall of the slot 332. The other end of the probe is coupled to a conductor wire 337 which is insulated for passage through the body, and is coupled with transmitter and/or receiver circuitry, depending on the intended purpose of the antenna. The other probe is similarly constructed.

Figure 4A:
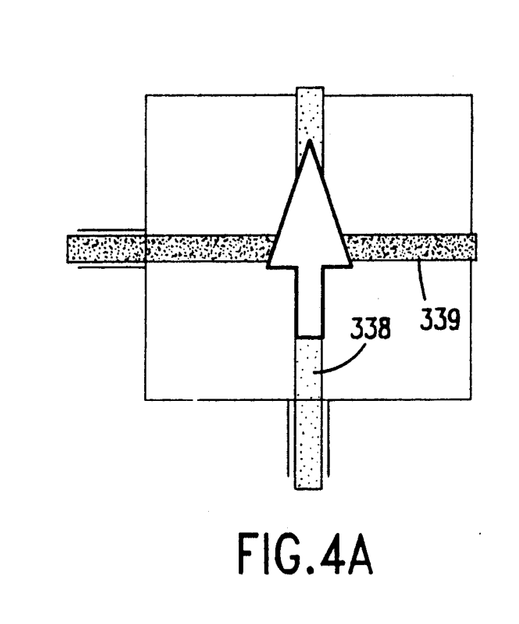
FIGS. 4A, 4B and 4C illustrate magnetic dipole moments that can be obtained with the antenna of FIG. 3.
Figure 4B:
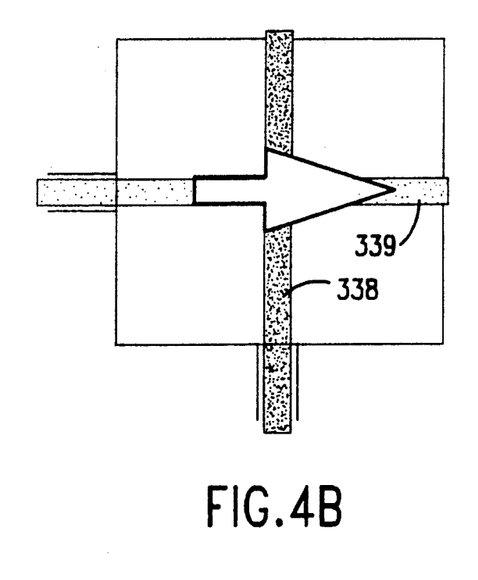
Figure 4C:
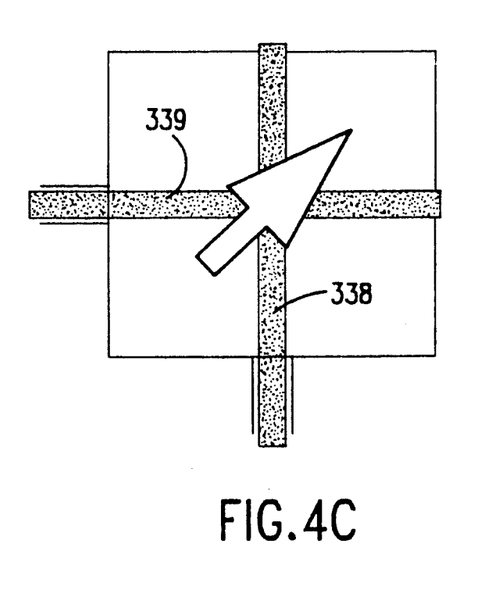

As described in the parent Application hereof, the cross-dipole antenna probes can be used to produce electromagnetic energy with a controlled magnetic moment direction (or angle). Referring, for example, to FIG. 4A, assume that the vertical probe element 339 is parallel to the longitudinal axis of the logging device and that the horizontal element 338 is perpendicular to said axis. Excitation of only the horizontal probe element (shown darkened) results in a vertical magnetic moment (as indicated by the arrow) and operation in an endfire mode. In the illustration of FIG. 4B, only the vertical probe element is excited, resulting in a horizontal magnetic moment and operation in a broadside mode. In FIG. 4C both probe elements are excited by application of equal signals to the probe elements, resulting in a 45 degree magnetic moment, as shown. As further described in the parent Application, application of signals of appropriate relative amplitudes and phases to the respective probe elements can produce a magnetic moment in any desired direction. Also, the antennas can be excited to operate in endfire and broadside modes either sequentially or simultaneously (an example of the latter being simultaneous transmission or reception at slightly different frequencies, such as 1.03 GHz and 1.00 GHz, which are substantially equivalent from a rock physics standpoint but which reduce cross-coupling between the probes).

Figure 5:
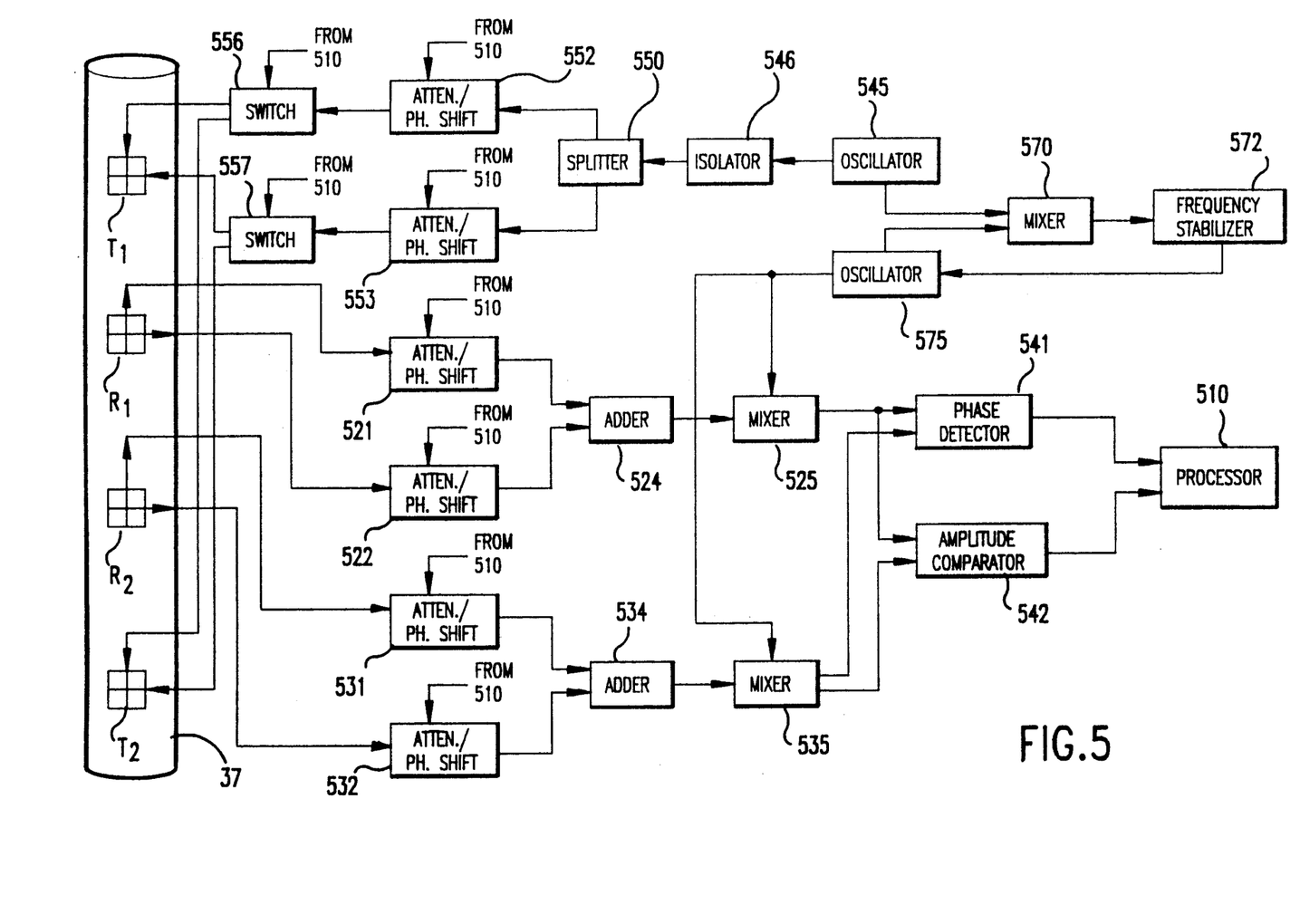
FIG. 5 is a schematic diagram, partially in block form, of antennas and circuitry utilized in an embodiment of the invention.

FIG. 5 illustrates a form of the pad 37 in accordance with an embodiment of the invention, and which contains the transmitting and receiving cross-dipole antennas in a longitudinally spaced borehole compensated arrangement $T_1$, $R_1$, $R_2$, $T_2$. FIG. 5 also shows the electronics which may be contained within the sonde 34. An oscillator 545 provides output energy which, in the present invention, is preferably greater than 100 MHz, and, in the example hereof is 1100 MHz. The output of oscillator 545 is coupled through isolator 546 to a splitter 550 which divides the input signal into two parts of prescribed proportions. The outputs of the splitter 550 are then passed through respective attenuator/phase-shifter circuits 552 and 553. These and other attenuator/phase-shifters have the capability of varying amplitude and/or phase under processor control. The outputs of attenuator/phase-shifters 552 and 553 are respectively coupled to switching circuits 556 and 557. The illustrated outputs of switch 557 are respectively coupled to the horizontal probes of transmitting antennas $T_1$ and $T_2$; that is, the probes which can excite the previously described endfire mode of operation. The illustrated outputs of switch 556 are respectively coupled to the vertical probes of antennas $T_1$ and $T_2$; that is, the probes which can excite the previously described broadside mode of operation.

The horizontal probes of the receiving antennas $R_1$ and $R_2$ are respectively coupled to attenuator/phase-shifters 522 and 532, and the vertical probes of the antennas $R_1$ and $R_2$ are respectively coupled to attenuator/phase-shifters 521 and 531. The receiver outputs can also be directly recorded, in this and all embodiments. The outputs of attenuator/phase-shifters 521 and 522 are coupled to an adding circuit 524 whose output is coupled to one input of a mixer 525. The outputs of attenuator/phase-shifters 531 and 532 are coupled to an adding circuit 534 whose output is coupled to one input of mixer 535. The outputs of mixers 525 and 535 are inputs to a phase detector 541 and are also inputs to an amplitude comparator 542. The outputs of phase detector 541 and amplitude comparator 542 are coupled to a downhole processor 510, which may be, for example, a digital processor having associated memory, timing, and input/output capabilities (not separately shown). The processor controls switches 556 and 557, and also controls attenuator/phase-shifters 552, 553, 521, 522, 531 and 532. A second input to mixers 525 and 535 is the output of a voltage-controlled oscillator 575 which is under control of a frequency stabilizer circuit 572. The outputs of oscillators 545 and 575 are coupled to mixer 570, the output of which is coupled to frequency stabilizer 572.

In the illustrated embodiment transmitters T1 and T2 are alternately enabled to implement "borehole compensated" operation, in this case by switches 556 and 557. In the present embodiment electromagnetic energy is transmitted sequentially from transmitters T1 and T2 into the surrounding media. Each of the switches 556, 557 can pass signal to one of its illustrated outputs or can pass no signal, depending on the control signal from processor 510. The processor can thus readily sequence energizing of the four transmitter probes. Energy received at the receiving antennas is coupled via the attenuator/phase-shifters and adders to inputs of the mixers 525 and 535. The signals which arrive from the receivers are out of phase with each other by a phase angle which depends upon properties of the media through which the energy has passed and have an amplitude ratio which also depends upon properties of such media. The secondary inputs of the mixers are supplied with energy at a frequency that is separated from the transmitter frequency by some relatively low frequency which is typically in the kilohertz frequency range. In the illustrated embodiment, oscillator 575 supplies electromagnetic energy to mixers 525 and 535 at a frequency that is, for example, 10 KHz. above the transmitter frequency. The outputs of the mixers 525 and 535 therefore contain the difference frequency of 10 KHz. In accordance with well known principles, the mixer outputs maintain the phase and amplitude relationships of the signals from the receivers, but the task of phase detection is greatly facilitated at the lower frequency of the mixed signals. To ensure that the difference frequency between the outputs of the oscillators 545 and 57 remains at 10 KHz, the oscillator outputs are sampled and fed to the mixer 570. The output of the mixer is received by the frequency stabilization circuit 572 which detects drifts from the 10 KHz standard and generates a correction signal which controls oscillator 575 in the manner of a conventional "phase-locked loop". As above-indicated, the mixer outputs are applied to the phase detector 541 and to the amplitude comparator 542. The output of the phase detector 541 is a signal level which is proportional to the phase difference between the signals received at the receivers and the output of amplitude comparator 542 is a signal level which is proportional to the relative amplitudes of the signals received at the receivers. The sequence of operation for borehole-compensated operation of FIG. 5 can be implemented for each magnetic moment direction by controlling the switches 556 and 557 as follows: transmit from $T_1$ in endfire mode; transmit from $T_2$ in endfire mode; transmit from $T_1$ in broadside mode; transmit from $T_2$ in broadside mode; and then repeat for the next magnetic moment direction.

The attenuator/phase-shifters 552 and 553 can control the phase and the amplitude of the energizing signals to control the direction of the magnetic moment of the electromagnetic signal transmitted from the individual antennas, $T_1$, $T_2$, as described in the parent Application hereof. The attenuator/phase-shifters 521, 522, 531 and 532 coupled with the receivers can provide further flexibility in synthesizing the desired magnetic moment direction. In the illustrated embodiment endfire and broadside mode components are used separately, and can be obtained by energizing one or the other of the probes in the transmitting antennas. The amplitude control functions of the receiver attenuator/phase-shifters are used in these embodiments for selectively disabling the receiver cross-dipole probes not being used at a given time. In particular, when an endfire mode component is transmitted, the processor 510 controls attenuator/phase-shifters 521 and 531 to pass no signal, and when the broadside mode is transmitted, the processor 510 controls attenuator/phase-shifters 522 and 532 to pass no signal. This prevents inclusion of a crosstalk signal from the receiver probe that is parallel to the direction of the magnetic moment direction of the transmitted electromagnetic energy.

Figure 6:
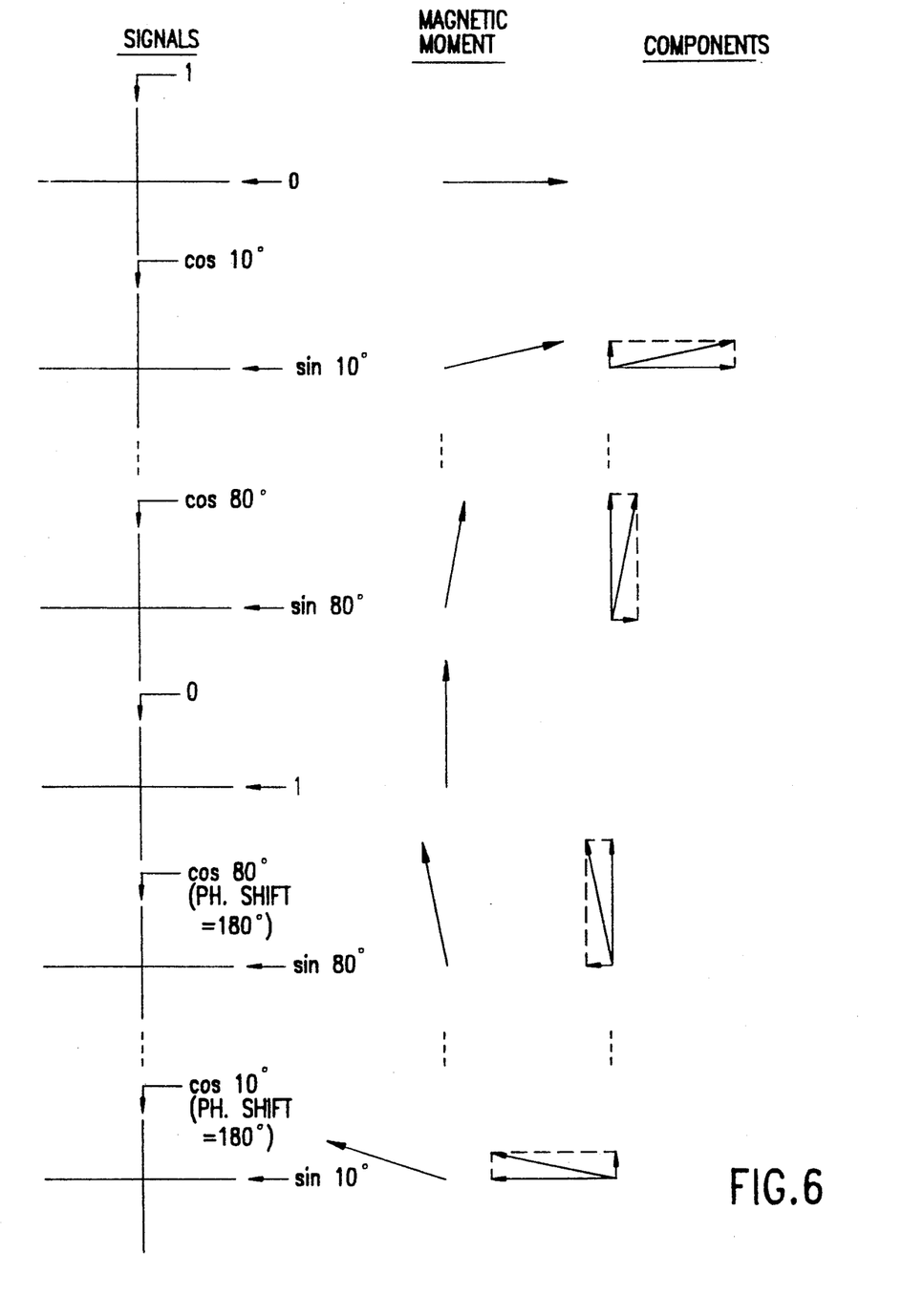
FIG. 6 is a diagram illustrating examples of magnetic moment angles (or directions) and how these angles can be obtained with orthogonal components of appropriate amplitude and phase.

FIG. 6 illustrates some representatives magnetic moment directions (or angles, with respect to the horizontal probe), and the amplitudes and phases of the signals which can be applied to the orthogonal antenna probes to obtain the desired magnetic moment angle. Table I shows the amplitudes and phase shifts applied by attenuator/phase-shifter circuits 552 and 553 (FIG. 5) to obtain magnetic moment angles scanned in 10 degree increments from 0 degrees to 170 degrees. This will ensure that at least one log will have a magnetic moment that is no more than a few degrees from perpendicular to the direction.

TABLE I

| magnetic moment angle | amplitude (552) | phase shift (552) | amplitude (553) | phase shift (553) |
|---|---|---|---|---|
| 0° | 1 | 0° | 0 | 0° |
| 10° | cos 10° | 0° | sin 10° | 0° |
| 20° | cos 20° | 0° | sin 20° | 0° |
| 30° | cos 30° | 0° | sin 30° | 0° |
| 40° | cos 40° | 0° | sin 40° | 0° |
| 50° | cos 50° | 0° | sin 50° | 0° |
| 60° | cos 60° | 0° | sin 60° | 0° |
| 70° | cos 70° | 0° | sin 70° | 0° |
| 80° | cos 80° | 0° | sin 80° | 0° |
| 90° | 0 | 0° | 1 | 0° |
| 100° | cos 80° | 180° | sin 80° | 0° |
| 110° | cos 70° | 180° | sin 70° | 0° |
| 120° | cos 60° | 180° | sin 60° | 0° |
| 130° | cos 50° | 180° | sin 50° | 0° |
| 140° | cos 40° | 180° | sin 40° | 0° |
| 150° | cos 30° | 180° | sin 30° | 0° |
| 160° | cos 20° | 180° | sin 20° | 0° |
| 170° | cos 10° | 180° | sin 10° | 0° |

For the magnetic moment at 0 degrees (broadside mode), only the vertical probe is energized, as indicated in the first row of Table I. A magnetic moment at an angle 10 degrees is obtained by applying a signal of amplitude cos (10°) to the vertical probe and a signal of amplitude sin (10°) to the horizontal probe. The vector addition for these conditions is illustrated in the second row of FIG. 6, and the amplitude and phase shift control by circuits 552 and 553 are listed in the second row of Table I. The controls at each 10 degree increment are then shown in subsequent rows of the Table, with selected illustrations of the vector addition being illustrated in FIG. 6. As seen in the Table, for magnetic moments having angles greater than 90°, the component applied to the vertical probe is phase shifted (by circuit 552) by 180 degrees so as to provide a component in a direction opposite to the 0 degree component, whereby vector addition can produce the desired magnetic moment angle as illustrated in FIG. 6 for the exemplary cases 100° and 170°.

Figure 7A:
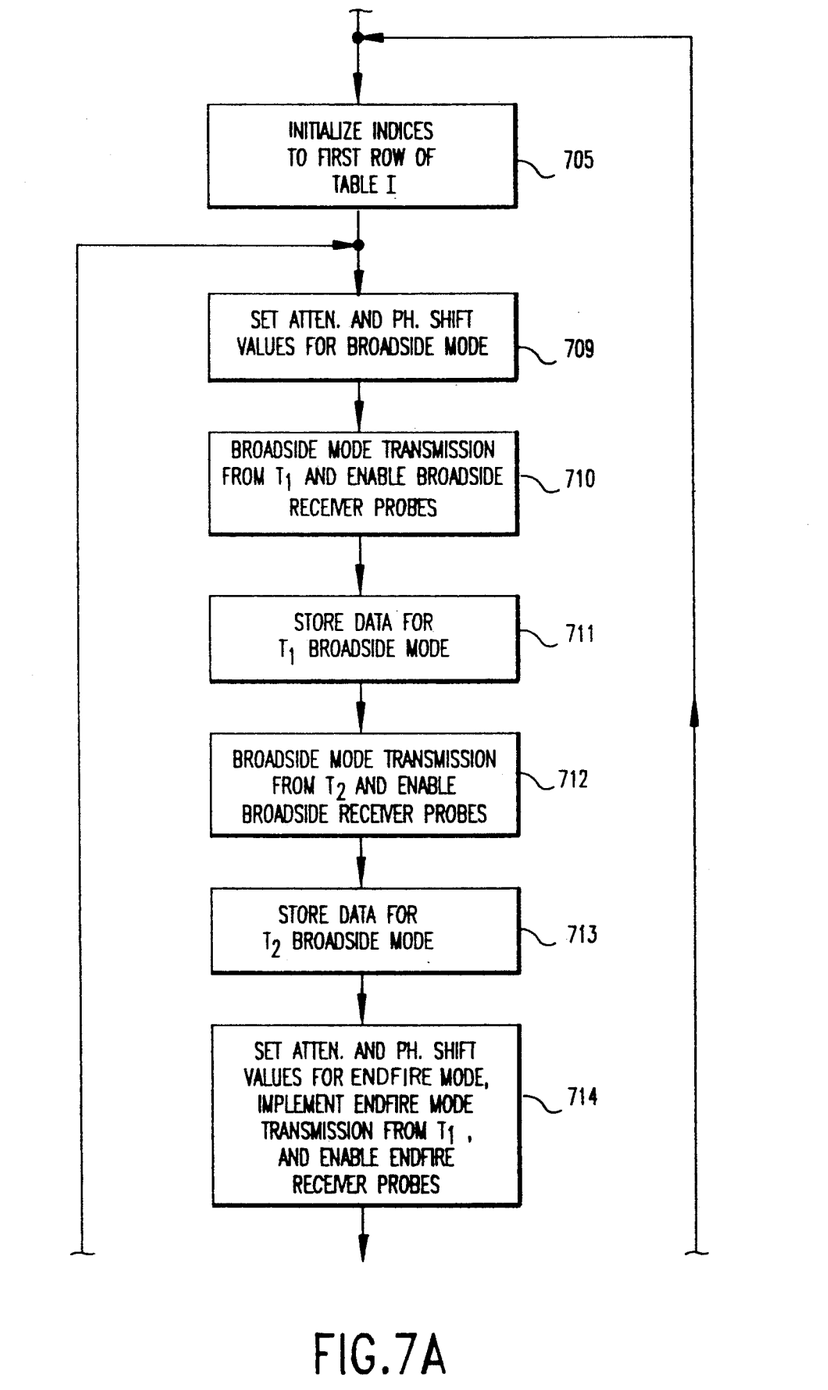
FIGS. 7A and 7B, placed one below another, show a flow diagram of a routine for controlling the downhole processor to obtain and store measurement information in an illustrated embodiment of the invention.
Figure 7B:
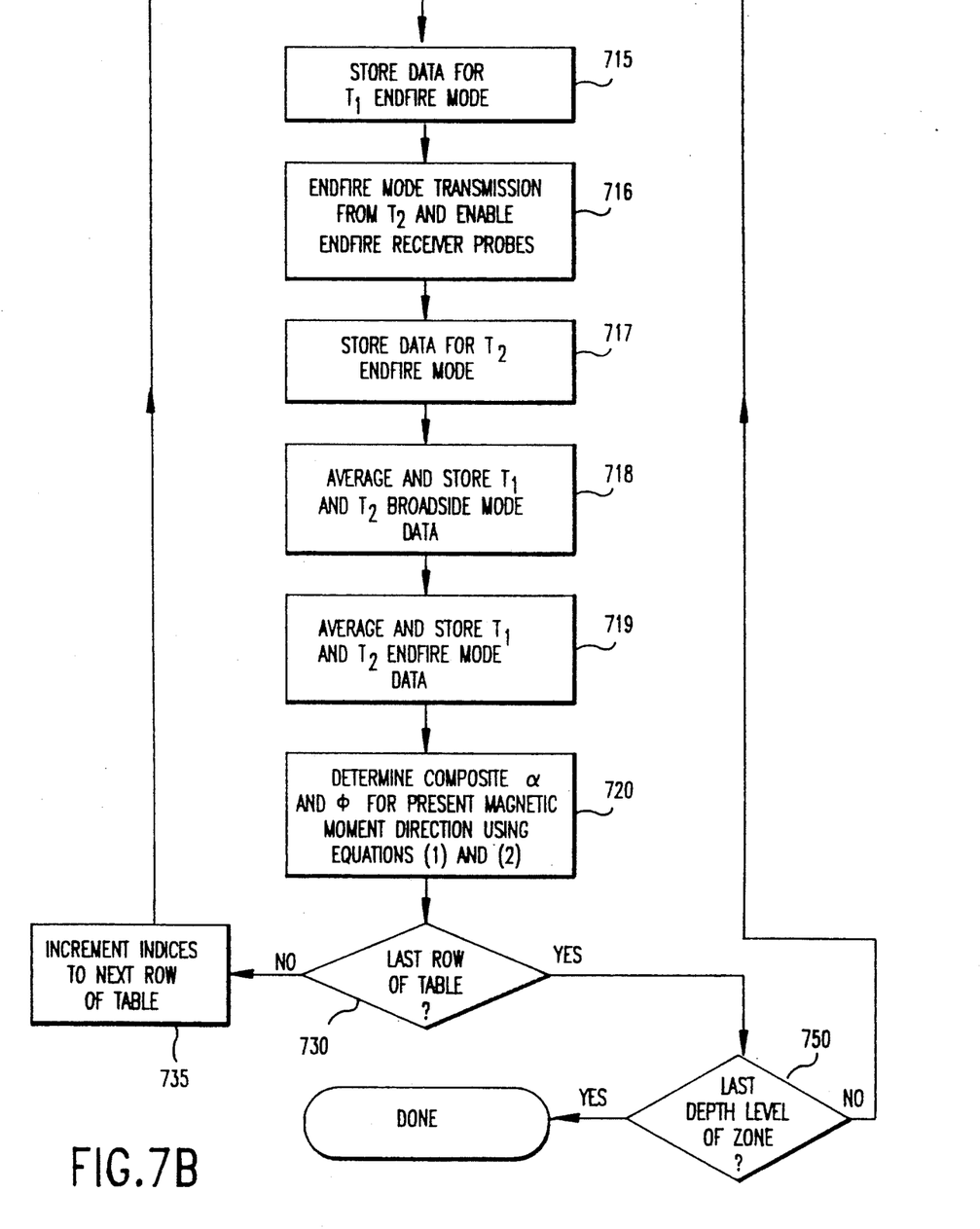

Referring to FIGS. 7A and 7B, there is shown a flow diagram of the routine for controlling the processor 510 to implement scanning of the magnetic moment direction as the logging device moves through the borehole. An entire scan sequence can be implemented in a small fraction of a second, and before the logging device has moved a meaningful distance in the borehole. It will be understood that the scanning hereof could be implemented with the logging device stationary and moved in increments, or the logging device moved at a typical continuous rate. In either case, each cycle of scanning and collecting data can be implemented before the logging device has moved meaningfully in the borehole, although this is not strictly necessary. The scan of the illustrated embodiment includes eighteen magnetic moment directions (or angles). If each subcycle takes for example, 300 microseconds, a full scan cycle would take 5.4 milliseconds, in which time the logging device would move less than 1 mm at a typical rate of movement of a logging device. Faster scanning rates are attainable, but it will be understood that slower scanning rates can be tolerated.

In FIGS. 7A and 7B, the block 705 represents initalizing of indices to the first row of Table I. the block 709 represents the setting of the attenuator/phase-shifter circuits 552 and 553 to their Table values for the broadside mode. In the present embodiment, these values are initially as indicated in the first row of Table I; that is, with only the vertical probe energized so that the magnetic moment is at 0 degrees. The transmitters $T_1$ and $T_2$ are then sequentially energized, and signal components are received at the receivers and processed and stored, as described in conjunction with blocks 710–720. In particular, the represents the enabling of broadside mode transmission from transmitter $T_1$ and enabling of obtainment of receiver signals from receiver probes oriented to receive the broadside mode. Specifically, the processor will control switch 556 to pass no signal, will control switch 557 to pass signal to the $T_1$ probe that produces a broadside mode, and will control attenuator/phase-shifters 521 and 531 to pass no signal, so that only the probes of $R_1$ and $R_2$ which couple efficiently to the broadside mode signal will be ultimately coupled to the phase detector 541 and the amplitude comparator 542. Data is stored for the $T_1$ broadside mode (with the amplitude and phase as previously selected), as represented by the block 711. Similarly, the blocks 712, 714, and 716 respectively represent transmission from $T_2$ in broadside mode, $T_1$ in endfire mode, and $T_2$ in endfire mode (all with the Table values for amplitude and phase), with enablement of the appropriate receiver signals in each case. The blocks 713, 715, and 717 respectively represent the storage of data for the indicated respective modes. The block 718 is then entered, this block representing the averaging and storing of the phase detector and amplitude comparator values obtained from $T_1$ and $T_2$ broadside data in order to obtain borehole compensated values of attenuation and phase. The block 719 represents the same averaging, but for the endfire mode data.

Values of attenuation, $\alpha$, and phase, $\phi$, have now been stored for the borehole-compensated broadside component ($\alpha_b$ and $\phi_b$) and the borehole-compensated endfire component ($\alpha_e$ and $\phi_e$), each having the previously selected amplitude and phase from a row of Table I. The composite $\alpha$ and $\phi$ values for the present magnetic moment direction (which is the vector addition of the indicated components) can be obtained from:

$$\alpha = 10 \log[A_e^2\sin^2\theta + A_b^2\cos^2\theta + A_eA_b\sin(2\theta)\cos(\phi_b - \phi_e)] \quad (1)$$

-continued $$\tan\phi = \frac{A_e \sin\phi_e \sin\theta + A_b \sin\phi_b \cos\theta}{A_e \cos\phi_e \sin\theta + A_b \cos\phi_b \cos\theta} \quad (2)$$

where $\theta$ is the magnetic moment angle with respect to the horizontal probe, and $$A_e = 10^{\alpha_e/20}$$

$$A_b = 10^{\alpha_b/20}$$

This determination is represented by the block 720. Inquiry is then made (diamond 730) as to whether the last magnetic moment direction has been reached; that is, the set of conditions indicated in the last row of Table I. If not, the Table row indices are incremented. The block is then re-entered, and data is obtained, recorded, and processed for the next magnetic moment direction. The loop 737 is then continued until data has been obtained for all magnetic moment directions; that is, for the present embodiment, each of the eighteen angles listed in Table I. Inquiry is then made (diamond 750) as to whether the logging device has reached the last depth level of a zone in which measurements are being taken. If not, the block 702 is re-entered, and scanning is re-initiated for the next depth level to be processed.

Figure 8A:
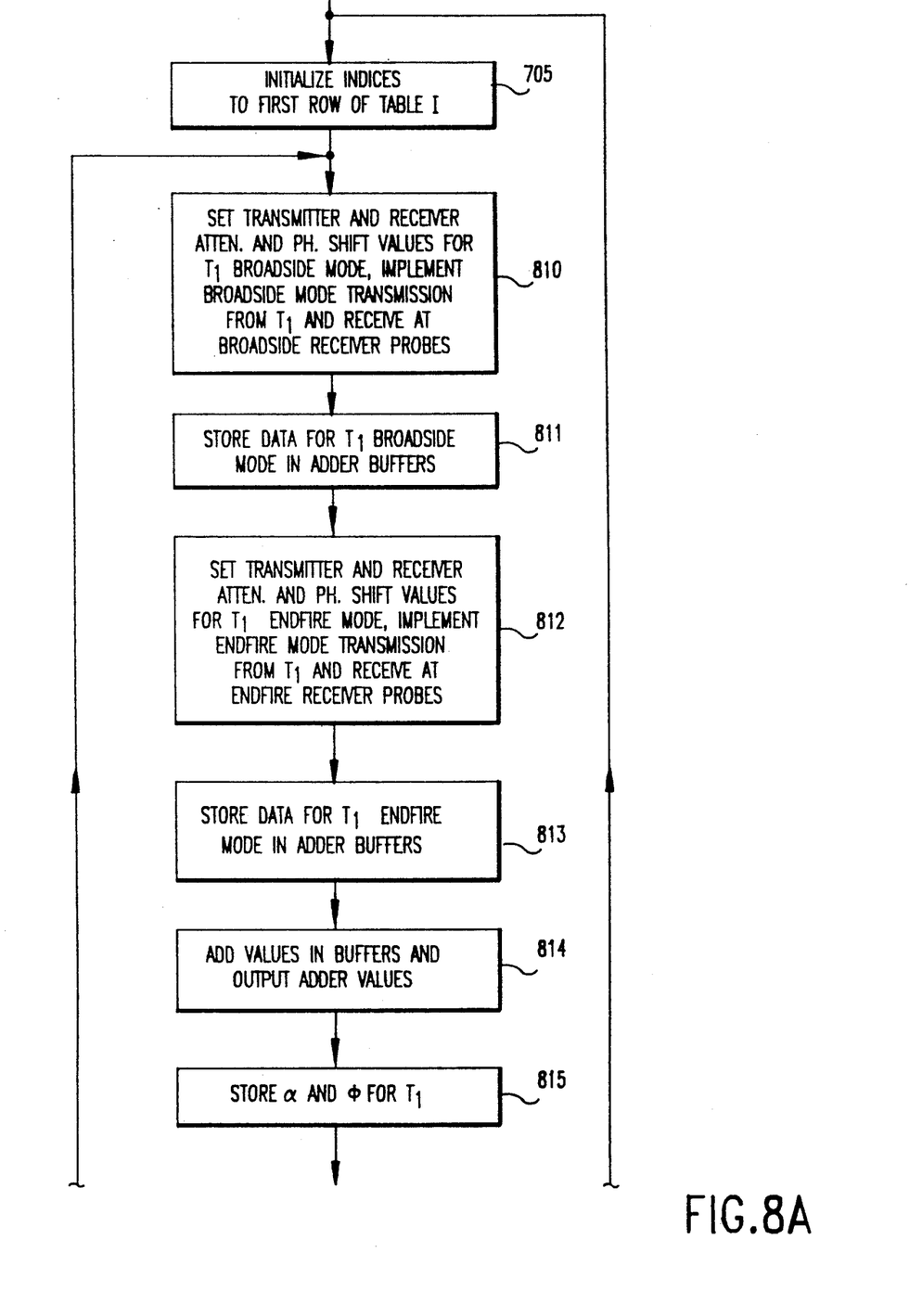
FIGS. 8A and 8B, placed one below another, show a flow diagram of another routine for controlling the processor.
Figure 8B:
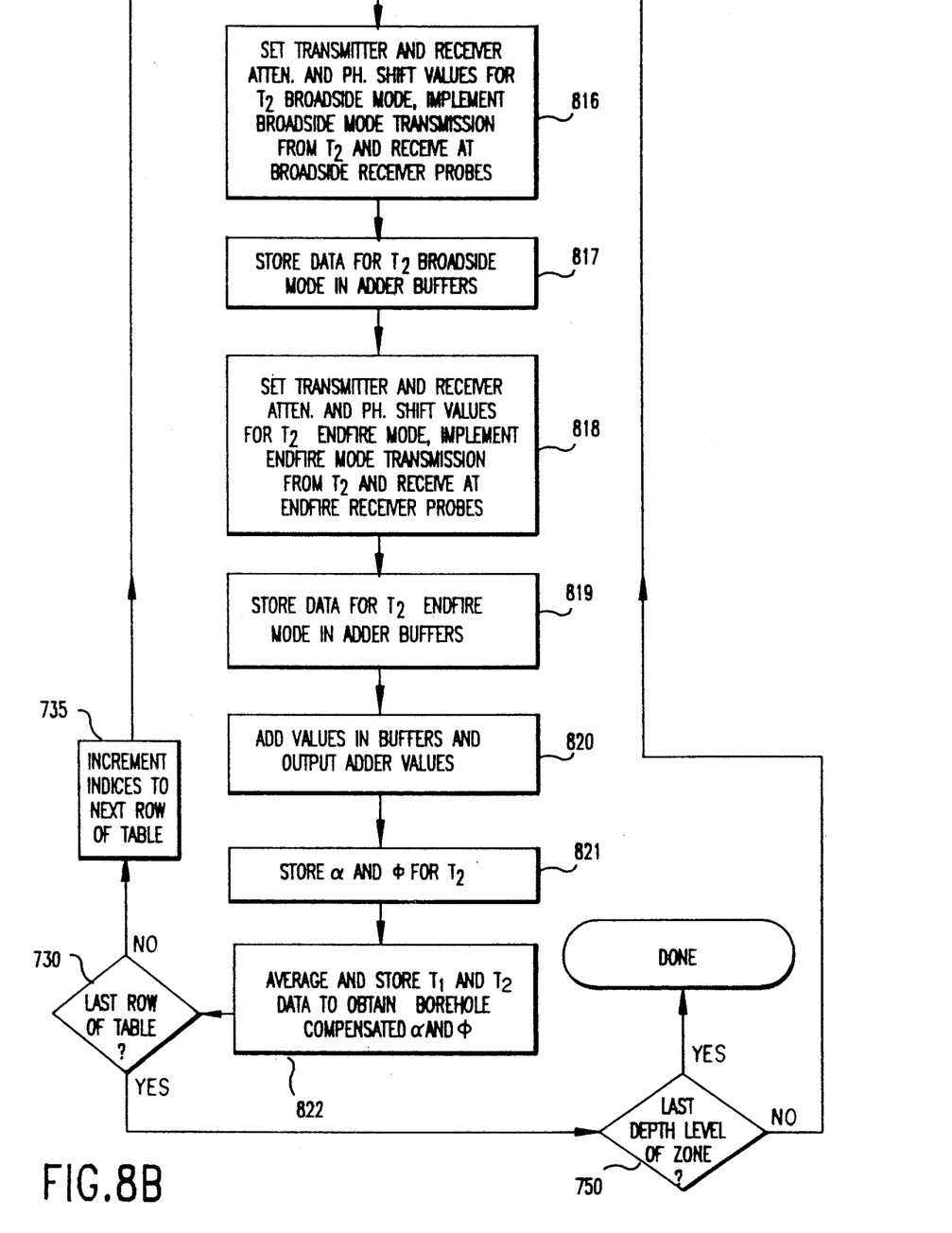
Figure 9:
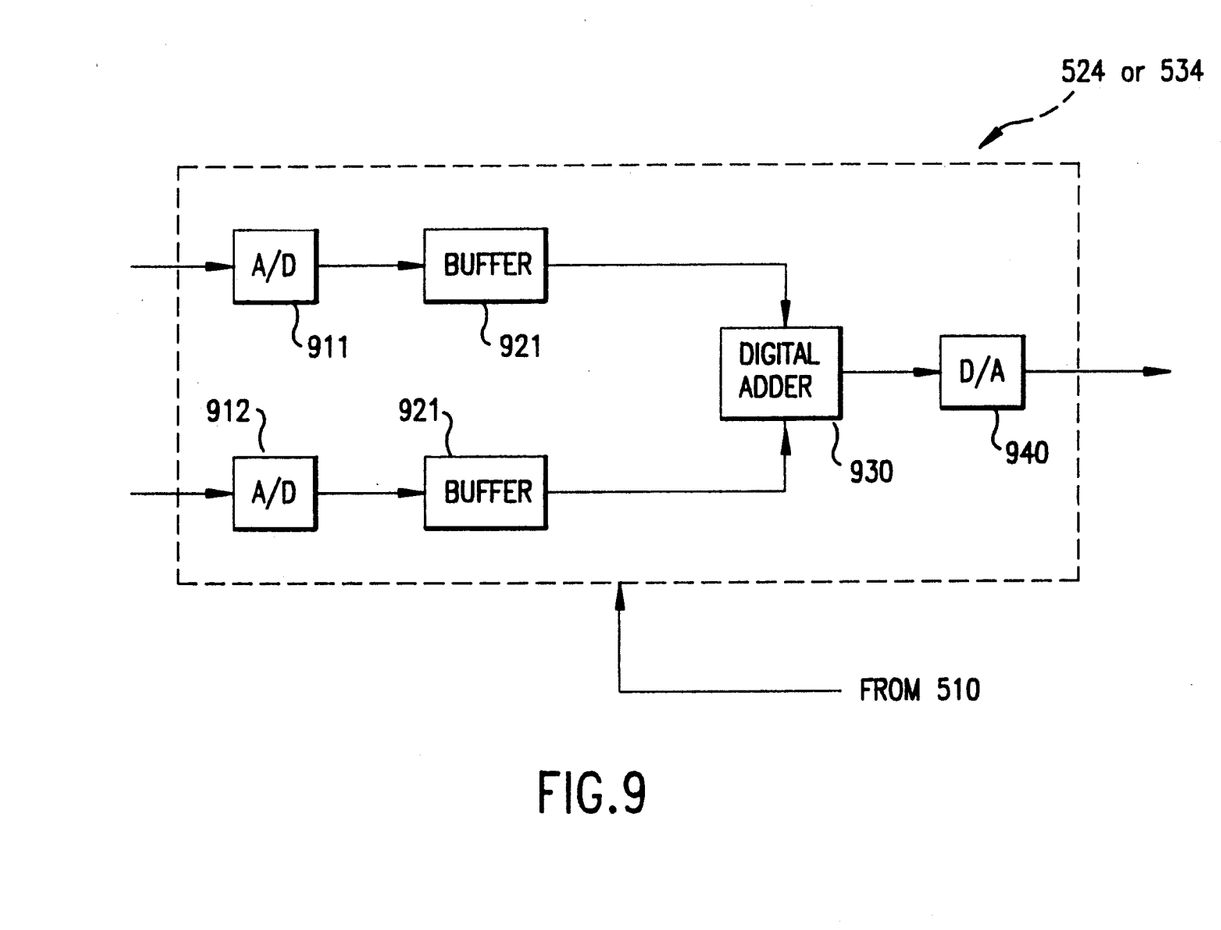
FIG. 9 is a block diagram of an adder circuit that can be used in an embodiment of the invention.

The attenuator/phase-shifters in the receivers (521, 522, 531, 532) can be used to effectively point the receiver circuitry in a magnetic moment direction that is the same as the magnetic moment direction at the transmitters. The flow diagram of FIGS. 8A and 8B illustrates the routine for this procedure. Blocks of FIGS. 8A and 8B are the same as corresponding blocks of FIGS. 7A and 7B with like reference numerals. The block 705 represents the initializing of indices to the values indicated in the top row of Table I, as in the FIGS. 7A and 7B flow diagram. In this embodiment, however, the attenuation/phase-shifters 521, 522, 531 and 532, associated with whichever receivers are active are also controlled to provide the amplitude and phase shift indicated by the present row of Table I. The block 810 represents the setting of the transmitter and receiver attenuation and phase shift values for $T_1$ broadside mode (in accordance with the Table), the broadside mode transmission from $T_1$, and the broadside reception. The block 811 represents the storage of the received signal in buffers provided in this embodiment in the adders (524 and 534 of FIG. 5). This is represented by the block 861. In this embodiment, a block diagram for the adders 524 or 534 is illustrated in FIG. 9. Under processor control, the received signals are digitized by analog-to-digital converters 911 and 912, respectively, and are coupled to buffers 921 and 931, the outputs of which are respectively coupled to digital adder 930. The output of the adder is converted back to an analog signal by digital-to-analog converter 940, for eventual coupling to the mixer (525 or 535 of FIG. 5).

Returning to FIGS. 8A and 8B, the same is then done for the $T_1$ endfire mode, as represented by the blocks 812 and 813. The values in the adder buffers are then added and read out to the mixers (block 814) for remaining processing; that is, storage of the outputs $\alpha$ and $\phi$ for the $T_1$ transmission (block 815). The same is then done for $T_2$ transmission, as represented by the blocks 816 through 821. The values of $\alpha$ and $\phi$ for $T_1$ and $T_2$ can then be averaged to obtain borehole compensated values of $\alpha$ and $\phi$, as represented by block 822. This technique has the advantage of combining the broadside and endfire signal measurements before computation of amplitude and phase for each transmitter's transmission.

It will be understood that data acquisition can be implemented continuously or in discrete cycles as a function of time or as a function of borehole depth level, for example. It will also be understood that the data acquisition for a particular scan can be performed in various ways. For example (and as first noted above), the data for the orthogonal components of the magnetic dipole electromagnetic energy can be obtained separately or simultaneously. In the illustrated embodiment, the components are transmitted and received separately and in a particular exemplary sequence. It will be understood that other sequences can be used. For example, all of the amplitudes and phases for one component could be scanned, and then the amplitudes and phases of the other component could be scanned (it being understood that the phase of only one component is varied in the example of Table I). The components could then be suitably combined in subsequent processing, as described.

We claim:

1. A method for logging formations surrounding an earth borehole, comprising the steps of:
   providing a logging device that is moveable through the borehole, said device including a transmitter for transmitting into the formations electromagnetic energy having a magnetic dipole characteristic and a receiver for receiving said electromagnetic energy from the formations;
   repeatedly scanning the magnetic dipole direction of said electromagnetic energy to several different directions as said logging device is moved through the borehole; and
   recording several logs as a function of the received electromagnetic energy, said logs being recorded for said respectively different magnetic dipole directions of said electromagnetic energy.

2. The method as defined by claim 1, wherein said several different magnetic dipole directions comprise directions that span more than 90 degrees.

3. The method as defined by claim 1, wherein said several different magnetic dipole directions comprise directions that span more than 135 degrees.

4. The method as defined by claim 1, wherein each scan of the magnetic dipole direction to said several different directions is implemented with said logging device having moved less than 1 mm in the borehole.

5. The method as defined by claim 3, wherein each scan of the magnetic dipole direction to said several different directions is implemented with said logging device having moved less than 1 mm in the borehole.

6. The method as defined by claim 1, further comprising measuring and storing the phase shift and attenuation of said received electromagnetic energy for said several different magnetic dipole directions.

7. The method as defined by claim 3, further comprising measuring and storing the phase shift and attenuation of said received electromagnetic energy for said several different magnetic dipole directions.

8. The method as defined by claim 6, further comprising determining the dielectric permittivity of said formations from said phase shift and attenuation of said electromagnetic energy for at least one of said magnetic dipole directions.

9. The method as defined by claim 7, further comprising determining the dielectric permittivity of said formations from said phase shift and attenuation of said electromagnetic energy for at least one of said magnetic dipole directions.

10. The method as defined by claim 8, further comprising determining the conductivity of said formations from said phase shift and attenuation of said electromagnetic energy for at least one of said magnetic dipole directions.

11. The method as defined by claim 9, further comprising determining the conductivity of said formations from said phase shift and attenuation of said electromagnetic energy for at least one of said magnetic dipole directions.

12. The method as defined by claim 6, further comprising determining the dielectric permittivity and conductivity of said formations from said phase shift and attenuation of said electromagnetic energy for said several different magnetic dipole directions.

13. The method as defined by claim 7, further comprising determining the dielectric permittivity and conductivity of said formations from said phase shift and attenuation of said electromagnetic energy for said several different magnetic dipole directions.

14. The method as defined by claim 1, wherein said step of scanning said magnetic dipole direction comprises generating components having orthogonal magnetic dipole directions, and controlling the relative amplitudes of said components to scan the magnetic dipole direction.

15. The method as defined by claim 3, wherein said step of scanning said magnetic dipole direction comprises generating components having orthogonal magnetic dipole directions, and controlling the relative amplitudes of said components to scan the magnetic dipole direction.

16. The method as defined by claim 6, wherein said step of scanning said magnetic dipole direction comprises generating components having orthogonal magnetic dipole directions, and controlling the relative amplitudes of said components to scan the magnetic dipole direction.

17. The method as defined by claim 14, further comprising controlling the phases of said components to scan the magnetic dipole direction.

18. The method as defined by claim 15, further comprising controlling the phases of said components to scan the magnetic dipole direction.

19. Apparatus for logging formations surrounding an earth borehole, comprising:

a logging device moveable through the borehole, said device including a transmitter for transmitting into the formations electromagnetic energy having a magnetic dipole characteristic and a receiver for receiving said electromagnetic energy from the formations;

means for scanning the magnetic dipole direction of said electromagnetic energy to several different directions; and means for recording signals dependent on the received electromagnetic energy, said signals being recorded for said respectively different magnetic dipole directions of said electromagnetic energy.

20. Apparatus as defined by claim 19, wherein said several different magnetic dipole directions comprise directions that span more than 90 degrees.

21. Apparatus as defined by claim 19, wherein said several different magnetic dipole directions comprise directions that span more than 135 degrees.

22. Apparatus as defined by claim 19, wherein said scanning means is operative to implement each scan of the magnetic dipole direction to said several different directions while said logging device has moved less than 1 mm in the borehole.

23. Apparatus as defined by claim 19, further comprising means for measuring and storing the phase shift and attenuation of said received electromagnetic energy for said several different magnetic dipole directions.

24. Apparatus as defined by claim 23, further comprising means for determining the dielectric permittivity and conductivity of said formations from said phase shift and attenuation of said electromagnetic energy for said several different magnetic dipole directions.

25. Apparatus as defined by claim 19, wherein said means for scanning said magnetic dipole direction comprises means for generating components having orthogonal magnetic dipole directions, and means for controlling the relative amplitudes of said components to scan the magnetic dipole direction.

26. Apparatus as defined by claim 25, wherein said means for scanning said magnetic dipole direction further comprises means for controlling the phases of said components.

27. Apparatus as defined by claim 19, wherein said transmitter and receiver each comprise a cross-dipole antenna.

28. Apparatus as defined by claim 25, wherein said transmitter and receiver each comprise a cross-dipole antenna.

29. Apparatus as defined by claim 19, wherein said transmitter comprises a pair of spaced apart cross-dipole antennas and said receiver comprises another pair of spaced apart cross-dipole antennas.

* * * * *

UNITED STATES PATENT AND TRADEMARK OFFICE
CERTIFICATE OF CORRECTION

PATENT NO. : 5,210,495

DATED : May 11, 1993

INVENTOR(S) : Habashy et al.

It is certified that error appears in the above-identified patent and that said Letters Patent is hereby corrected as shown below:

On the title page, in item [75]:

"Hapashy" should read -- Habashy --.

Signed and Sealed this

Fifteenth Day of February, 1994

Attest:

BRUCE LEHMAN

*Attesting Officer*   *Commissioner of Patents and Trademarks*